(12) United States Patent
Levine

(10) Patent No.: US 6,497,168 B1
(45) Date of Patent: Dec. 24, 2002

(54) LASER ALIGNMENT SYSTEM FOR SAWS WITH ROTATING BLADES

(76) Inventor: Bernard I. Levine, 26600 Woodbury Dr., Torrance, CA (US) 90503

( * ) Notice: Subject to any disclaimer, the term of this patent is extended or adjusted under 35 U.S.C. 154(b) by 103 days.

(21) Appl. No.: 09/680,074

(22) Filed: Oct. 6, 2000

(51) Int. Cl.$^7$ ................................. B60D 7/00
(52) U.S. Cl. ................. 83/520; 83/522.17; 83/471.2; 83/477.1; 83/663; 30/390; 30/391
(58) Field of Search .................. 83/520, 522.15, 83/471.2, 477.1, 478, 521, 522.22, 522.17, 522.11, 522.23, 522.24, 663, 676, 522.16; 30/123, 390

(56) References Cited

U.S. PATENT DOCUMENTS

| | | | | |
|---|---|---|---|---|
| 2,806,492 A | * | 9/1957 | Becker ......................... | 83/520 |
| 4,257,297 A | * | 3/1981 | Nidbella ....................... | 83/471.3 |
| 4,300,836 A | * | 11/1981 | Holmes et al. ............... | 250/202 |
| 4,906,098 A | * | 3/1990 | Thomas et al. ............... | 209/525 |
| 5,038,481 A | * | 8/1991 | Smith ........................... | 30/123 |
| 5,199,343 A | * | 4/1993 | O'Banion ..................... | 83/397 |
| 5,285,708 A | * | 2/1994 | Bosten et al. ................ | 362/89 |
| 5,461,790 A | * | 10/1995 | Olstowski ..................... | 30/390 |
| 5,675,899 A | * | 10/1997 | Webb ............................ | 30/390 |
| 5,862,727 A | * | 1/1999 | Kelly ............................ | 408/16 |
| 5,996,460 A | * | 12/1999 | Waite ........................... | 30/123 |
| 6,035,757 A | * | 3/2000 | Caluori et al. ................ | 30/392 |
| 6,320,642 B1 | * | 11/2001 | Ogawa et al. ................ | 355/27 |

\* cited by examiner

Primary Examiner—Boyer D. Ashley
(74) Attorney, Agent, or Firm—Irving Keschner

(57) ABSTRACT

A saw having a rotating blade and a laser beam alignment system, a rotating, multi-sided member having reflecting surfaces formed on each edge being mounted to one side of the rotating saw blade. A laser device is positioned in front of the blade guard with a mounting bracket, the beam generated thereby being reflected by the multi-sided member onto a work piece. The laser beam provides a visual cutting line to enable the saw operator to align the work piece accurately.

1 Claim, 2 Drawing Sheets

LASER ALIGNMENT SYSTEM FOR SAWS WITH ROTATING BLADES

BACKGROUND OF THE INVENTION

1. Field of the Invention

The present invention provides a laser system mounted on a rotary saw to provide accurate alignment of the saw blade as it cuts a work piece along a specified direction.

2. Description of the Prior Art

When cutting a work piece, such as a wood piece, the conventional technique is to mark a line on the surface of the piece to enable the operator of a rotary blade saw to follow the line to ensure that an accurate cut is made along the line.

This technique has inherent disadvantages in that following the line during the cutting operation requires the operator to continually observe the line in front of the cutting blade as the blade is pushed along the guidelines. In addition, the prepared line may not be straight, if marked by non-skilled operator, and may be to faint to be observed.

U.S. Pat. No. 5,675,899 to Webb discloses a rotary saw equipped with a laser device, the generated laser beam projecting through a slit in an end cap, the projected beam being in alignment with the cutting blade of the saw. The rotating laser is fed power through a brush arrangement and the sighting laser device is a permanent part of the rotary saw. U.S. Pat. No. 4,333,373 to Blickenderfer discloses a positionary and feed system for cants or boards which includes a device for generating a laser light line. The overall system is very complex and expensive and not adaptable for use as a rotary saw. U.S. Pat. No. 6,035,757 to Caluori et al discloses a cut alignment device for use with a rotary saw and includes a battery powered laser that rotates with the saw blade.

What is thus desired is to provide a simple and cost effective rotary saw having an alignment device.

SUMMARY OF THE PRESENT INVENTION

The present invention provides a rotary saw having a laser beam alignment system. A rotating, multi-sided member having reflecting surfaces formed on each edge, is mounted to one side of the rotating saw blade. A laser device is mounted on the front of the saw guard with a mounting bracket, the beam generated thereby being reflected by the multi-sided member onto a work piece to be cut. The laser beam provides a cutting line to enable the saw user to align the work piece accurately;

The present invention thus provides a simple and cost effective laser alignment system for use with a saw with a rotating blade which can be utilized with newly manufactured saws or retrofitted to existing saws.

BRIEF DESCRIPTION OF THE DRAWINGS

For better understanding of the present invention as well as other objects and further features thereof, reference is made to the following description which is to be read in conjunction with the accompanying drawing therein.

DESCRIPTION OF THE PRESENT INVENTION

Figure 1:
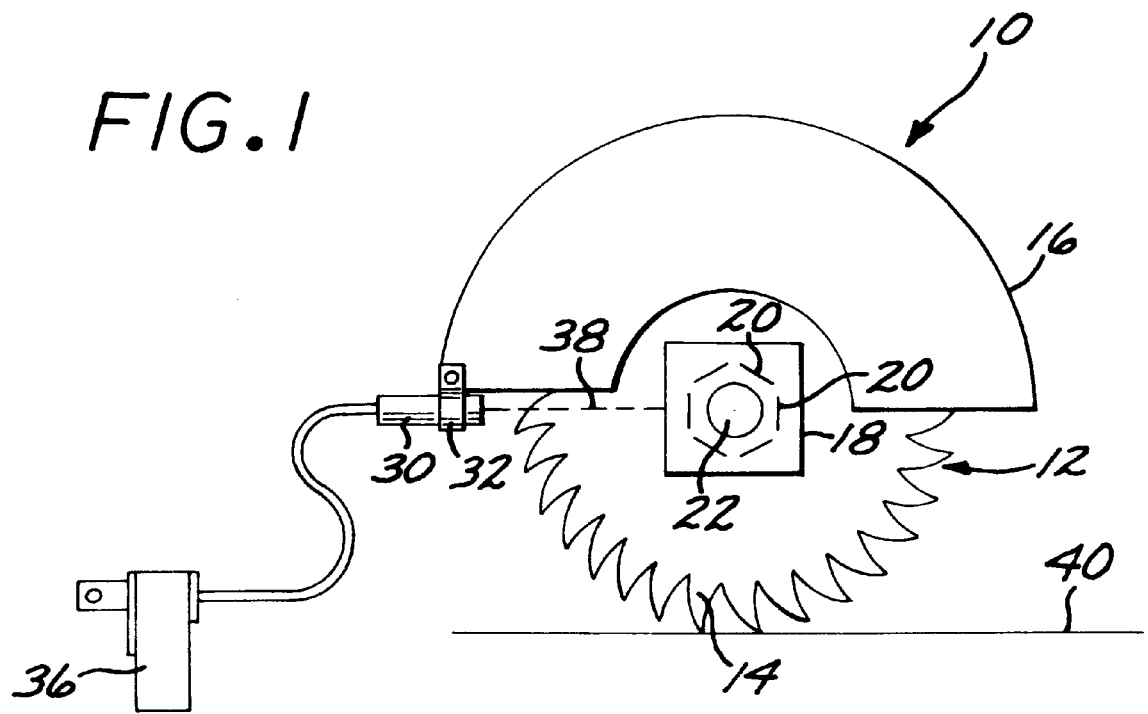
FIG. 1 is a simplified plan view of the saw system of the present invention.
Figure 2:
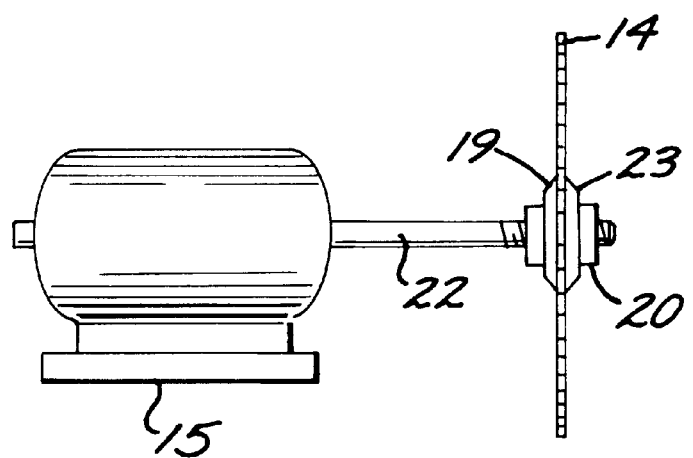
FIG. 2 is a simplified side view of the saw system using conventional blade flanges.

Referring now to FIGS. 1 and 2, simplified views of the saw system 10 of the present invention are illustrated.

Figure 3:
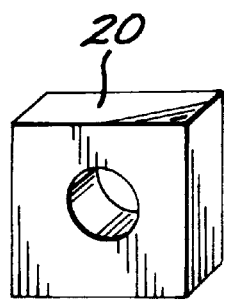
FIG. 3 illustrates the arbor nut utiliized in the system shown in FIG. 1.
Figure 4:
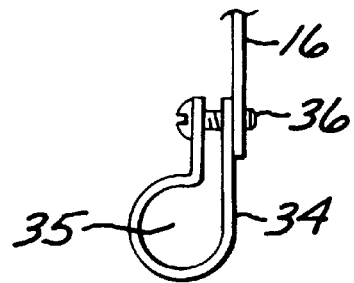
FIG. 4 illustrates a mounting bracket for mounting a laser to the rotary saw in accordance with the teachings of the present invention.

System 10 comprises a conventional saw 12 having a rotary blade 14, motor 15, blade guard 16 and shoulder 17. The present invention can be utilized with stationary saw machines, such as radial arm saws, power motor boxes, wet saws, etc. In accordance with the teachings of the present invention, a rotatable member 18 having a plurality of reflective surfaces 21 is mounted on saw arbor 22 (motor shaft) by arbor nut 20. FIG. 3 illustrates in more detail member 20 and shows two of the reflecting surfaces 21 fastened to arbor nut 20. An arbor nut which has been successfully utilized was 1.625 inch square and 0.5 inches thick. Reflecting surfaces 21 may comprise glass mirror or a reflective metal surface. Although member 18 is hexagonally shaped, alternate shapes, including, but not limited to, rectangular, triangular, etc. can also be used. Member 18 preferably replaces one of the two conventional blade flanges 19, 23 provided with the saw 12. If the saw 12 is not equipped with flanges, member 18 can be placed on the arbor shaft 22 adjacent blade 14. In accordance with a further aspect of the present invention, a laser 30 is mounted to blade guard 16 by a clamp, or mounting bracket 32, shown in more detail in FIG. 2. Clamp 32 is selected to have the capability of mounting laser 30 to guard 16 and comprises shaped clamp 34 having an open area 35 for receiving the laser 30 and fastener 36 for both mounting the laser 30 to guard 16 and securing the laser in opening 35.

Laser 30, as illustrated in FIG. 1, is coupled to a AC power source through a transformer/rectifier 36 and generates a laser beam 38, the beam aligned to be incident on the reflecting surfaces 21 formed on member 18.

Figure 6:
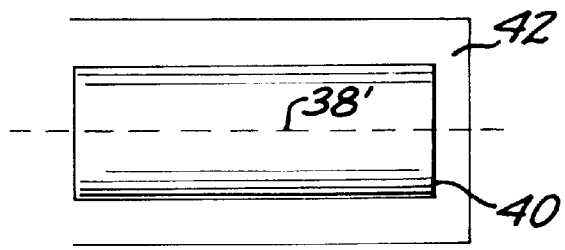
FIG. 6 illustrates the sighting line superimposed on a wood piece.

In use, a piece of wood 40 is positioned on table 42 as shown in FIG. 6. When a cut is to be made, a power switch (not shown) is activated in a manner to cause blade 14 to rotate and energize laser 30. Laser beam 38 is reflected from reflective surfaces 21 in a manner such that a continuous sighting line 38' is projected onto the surface of woodpiece 40. Since the laser 30 is mounted to the blade guard 16, line 38' is in alignment with (although slightly offset) with the cutting line of the blade 14.

The laser 30 is of the inexpensive variety and, for example, may comprise the type of laser used in pointing devices such as those sold by Radio Shack. Another example of a laser that can be used is one sold by Sean & Stephen Corporation, Zhong Shan City, China. Preferably, any pen shaped laser unit can be utilized because of its small shape, lightweight characteristics and relatively low cost. It should be noted, however, that other laser geometries could also be utilized. The laser/scanning components of the present invention can be easily retrofitted to saws having rotating blades already in use or provided as an accessory for new machines being marketed.

The present invention thus provides a saw sighting device which is simple, cost effective, and easily retrofitted to existing saws having rotating blades.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A saw having a rotating blade and a blade guard member with a sighting device mounted thereto, the improvement comprising:

a motor having an output shaft; said output shaft being coupled to said blade whereby said blade is caused to rotate;

a rotating member having a plurality of surfaces formed along its circumference and mounted to said output shaft to rotate therewith, said rotating member having reflecting members formed on each of said surfaces; and a laser member mounted to said blade guard, said laser member generating a laser beam when energized, said laser member and said rotating member being positioned such that said laser beam is incident on said reflecting members whereby said laser beam is reflected to form a scanning line on a work piece.

* * * * *

UNITED STATES PATENT AND TRADEMARK OFFICE
CERTIFICATE OF CORRECTION

PATENT NO.   : 6,497,168 B1
DATED        : December 24, 2002
INVENTOR(S)  : Bernard I. Levine It is certified that error appears in the above-identified patent and that said Letters Patent is hereby corrected as shown below:

<u>Title page,</u>
Item [76], the address of the inventor should appear as follows: -- 2600 Woodbury Drive,
Torrance, CA 90503--.

Figure 5:
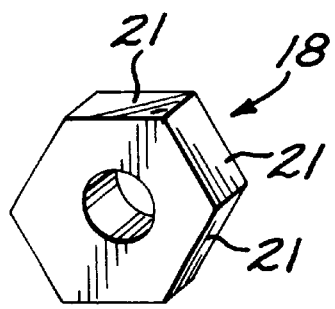
FIG. 5 illustrates the rotating polygon utilized in the system shown in FIG. 1.

<u>Drawings,</u>
Sheet 2, Figure 3, the reference numeral " 20" should read -- 18 --.
Reference numerals 21 and associated lead lines should be applied to the top and side of the rotating polygon;
In Figure 5, reference numeral "18" should read -- 20 -- and the reference numeral 21 and its associated lead lines should be deleted.
In Figure 6, the dashed line 38' should be solid.

<u>Column 1,</u>
Line 9, the phrase "as it cuts a work piece" should read -- prior to cutting --; "direction" should read -- line --;
Line 37, "rotating saw having an alignment device" should read -- alignment device for a saw having a rotating blade --.
Line 63, "arbor nut" should read -- rotating polygon --.

<u>Column 2,</u>
Line 1, "rotating polygon" should read -- arbor nut --;
Line 12, "shoulder 17" should read -- blade flanges 19 and 23 --;
Line 15, "motor" should read -- miter --;
Line 21, "20" should read -- 18 --;
Line 22, "to" should read -- with --;
Line 23 "0.5" should read -- 0.125 --; "an arbor nut" should read -- a rotating Member --;
Lines 25-26 "hexagonally" should read -- square --;
Line 27, "rectangular" should read -- hexagonal --;
Lines 29-30, "If the saw is not equipped with flanges, member" should read -- Member --; "can be" should read -- is --;

UNITED STATES PATENT AND TRADEMARK OFFICE
CERTIFICATE OF CORRECTION

PATENT NO. : 6,497,168 B1
DATED : December 24, 2002
INVENTOR(S) : Bernard I. Levine It is certified that error appears in the above-identified patent and that said Letters Patent is hereby corrected as shown below:

<u>Column 2, cont'd,</u>
Line 35, " 2" should read -- 4 --;
Line 38, "both" should be deleted;
Line 39, "and securing the laser in opening. 35" should be deleted;
Line 53, delete "(although slightly offset)";
Line 64, delete "/scanning".

Signed and Sealed this

Twelfth Day of August, 2003

JAMES E. ROGAN
*Director of the United States Patent and Trademark Office*